United States Patent [19]
Miller et al.

[11] Patent Number: 5,143,400
[45] Date of Patent: Sep. 1, 1992

[54] ACTIVE TOE ADJUSTMENT APPARATUS

[75] Inventors: Gerald R. Miller; Jean P. Couratier, both of Greer, S.C.

[73] Assignee: Michelin Recherche et Technique, Switzerland

[21] Appl. No.: 727,400

[22] Filed: Jul. 5, 1991

Related U.S. Application Data

[63] Continuation of Ser. No. 392,214, Aug. 10, 1989, abandoned.

[51] Int. Cl.$^5$ .............................................. B62D 17/00
[52] U.S. Cl. ....................................... 280/661; 280/91
[58] Field of Search ................... 280/661, 91; 180/140, 180/142, 79.1

[56] References Cited

U.S. PATENT DOCUMENTS

| | | |
|---|---|---|
| 663,986 | 12/1900 | Thornycroft . |
| 663,986 | 12/1900 | Thornycroft . |
| 2,756,066 | 7/1956 | Ludowici ............................. 280/91 |
| 3,294,368 | 12/1966 | Hunter ............................. 254/100 |
| 3,498,630 | 3/1970 | Crawford ........................... 280/846 |
| 3,597,728 | 8/1971 | Kurtz ................................. 180/271 |
| 3,597,729 | 8/1971 | Kurtz ................................. 180/271 |
| 4,371,191 | 2/1983 | Goldberg ........................... 280/661 |
| 4,398,616 | 8/1983 | Braden et al. . |
| 4,402,603 | 9/1963 | Lill et al. . |
| 4,402,603 | 9/1983 | Lill et al. . |
| 4,498,554 | 2/1985 | Young et al. . |
| 4,498,554 | 2/1985 | Young et al. . |
| 4,545,602 | 10/1985 | Shibahata ............................ 280/91 |
| 4,600,205 | 7/1986 | Stewart et al. . |
| 4,706,978 | 11/1987 | Ito ........................................ 280/91 |
| 4,768,603 | 9/1988 | Sugiyama ............................ 280/91 |
| 4,796,720 | 1/1989 | Bauer . |
| 4,796,720 | 1/1989 | Bauer . |
| 4,796,904 | 1/1989 | Kubo et al. ......................... 280/91 |
| 4,811,969 | 3/1989 | Sugiyama ............................ 280/91 |
| 4,828,283 | 5/1989 | Ishij et al. ........................... 280/91 |
| 4,835,714 | 5/1989 | Sano .................................. 280/661 |
| 4,926,954 | 5/1990 | Ataka ................................. 280/91 |
| 5,002,147 | 3/1991 | Klosterbaus ....................... 180/79 |
| 5,014,802 | 5/1991 | Knoll et al. .................. 364/424.05 |

FOREIGN PATENT DOCUMENTS

| | | |
|---|---|---|
| 150858A3 | 1/1985 | European Pat. Off. . |
| 60-259572 | 12/1985 | Japan ................................. 280/91 |
| 62-178407 | 8/1987 | Japan ................................. 280/91 |
| 63-2773 | 1/1988 | Japan ................................. 280/91 |
| 63-2774 | 1/1988 | Japan ................................. 280/91 |
| 63-159117 | 7/1988 | Japan ................................. 280/91 |
| 63-270284 | 11/1988 | Japan ................................. 280/91 |
| 2182005A | 10/1986 | United Kingdom . |
| 2202198A | 3/1987 | United Kingdom . |

OTHER PUBLICATIONS

SAE/SP-240, R. B. Kazer, Use of Computers in Steering Geometry Anlysis, Dec. '62, pp. 1 and 2.
SAE 861975, Gerald R. Miller, The Effect of Ackerman Steering Correction Upon Front Tire Wear of Medium Duty Trucks, Nov. '86, pp. 4, 5, 6 and 7.

*Primary Examiner*—Charles A. Marmor
*Assistant Examiner*—Karin Tyson
*Attorney, Agent, or Firm*—Robert R. Reed

[57] ABSTRACT

The advantage of the theoretically correct Ackerman steering of land vehicles is well documented in the literature. Steering forces, vehicle handling, and tire wear are greatly improved by having correct toe angles of all steerable wheels. Adjustements in the suspension system and steering apparatus at the factory only provide first-order corrections to toe angles. A process for actively adjusting toe angles during operation of the vehicle is disclosed in this invention. Vehicle dynamics measuring devices to sense vehicle motion or position steering devices to measure toe angles are used in this process. Secondary toe angle corrections can be actively provided to account for inherent toe angle changes during maneuvers of the vehicle. An aftermarket apparatus for actively adjusting the toe angle is an embodiment of this invention. One such device includes a mechanical screw actuator apparatus, a microstepping motor with optical encoder, computer with control strategy chip and a toe angle sensing device or an onboard dynamics computer. This apparatus can be used on all land vehicles and is especially useful for modifying existing truck and bus steering systems.

3 Claims, 5 Drawing Sheets

ACTIVE TOE ADJUSTMENT APPARATUS

This is a continuation of copending application Ser. No. 07/392,214 filed on Aug. 10,1989, now abandoned.

TECHNICAL FIELD

THIS INVENTION CONCERNS THE STEERING MECHANISMS OF LAND VEHICLES. MORE PARTICULARLY IT RELATES TO DEVICES TO SENSE THE TOE ANGLES OF STEERABLE WHEELS AND TO ADD AN APPARATUS TO ACTIVELY ADJUST THIS TOE ANGLE AND ACHIEVE IMPROVED VEHICLE PERFORMANCE.

BACKGROUND OF THE INVENTION

The Ackerman steering principle states that when a vehicle with front steerable wheels negotiates a turn, the center of the turn lies on a line which is the extension of the rear axle center line. The theory of this principle is that, at least at low speeds, all tires rotate around this turn axis in a circle without slippage. The radius of this circle is determined by the steer angle of the two front steerable wheels. For proper steering geometry in a turn, the rotational axes of the front outside wheel and the front inside wheel should intersect at a common point. This point should be on the same turn axis of vehicle rotation. This theory is correct when the slip angles of all tires are zero, and is also thought to be a good design for steering mechanisms in general. To comply with Ackerman geometry the inside front wheel must have a greater steer angle than the outside front wheel. The difference in the inner wheel steer angle compared with the outside wheel steer angle is a function of the type of vehicle, suspension system and the design of its steering devices. Ackerman compliance will result in a pure rolling motion of the wheels, which is conducive to easier turning, less tire scuffing and less load reactions on the steering and suspension systems. The turn is defined by an axis perpendicular to the rear axle center line at a point which is the center of the turn.

The Ackerman theory first appeared in U.S. Pat. No. 663,986 issued in 1900. Several of the other referenced patents describe the Ackerman principle in detail, but describe mechanisms and detailed steering components, differing from one another in varying degrees, which improve steering and handling of the vehicle.

The theory of Ackerman extend to a four wheel steering vehicle suggests that minimum slippage of all tires will occur when they are rotating in a circle around a single turn axis. Therefore, the projection of rotational axes of all wheels should intersect this turn axis. One objective of U.S. Pat. No. 4498554, issued in 1985, was to achieve true Ackerman steering in the four wheel steered vehicle.

As described by R. B. Kazmier in his 1962 SAE paper entitled "Use of Computers in Steering Geometry Analysis", a given steering linkage system gives perfect steering for only one turning angle of the wheels. For other turn angles an error is introduced, the magnitude of which will depend upon the lengths and inclinations of the steering arms. Static toe and camber adjustments in the linkage are usually provided for the straight ahead position of the wheels or zero steer angles. A proper combination of steering linkages is necessary to minimize this error throughout the steering range.

One of the joint inventors in his 1986 SAE paper entitled "The Effect of Ackerman Steering Correction Upon Front Tire Wear of Medium Duty Trucks" gives data for actual tire tests which project 36.7% and 30.2% improvements in tire mileage with zero percent Ackerman error.

Having a correct steer angle for pure rolling motion is further influenced by the vehicle suspension during braking, acceleration, load transfer in a turn and a bump or depression in the surface. When the individual wheel of most vehicle suspension systems is extended (rebound) or compressed (jounce) the steer angle changes. The standard steering linkage system will not adjust for these changes. The object of U.S. Pat. No. 4796720, issued in 1989, is to provide a complete steering and suspension system which steers and tracks all wheels and provides a power assist for wheel camber adjustment and vehicle body leveling.

A variety of apparatus and systems exist which permits the sensing of the toe angle relative to the vehicle centerline. With known geometry of the steering and suspension system and the positions of one element in each linkage systems relative to the vehicle, the toe angles can be calculated. One such apparatus is described in U.S. Pat. No. 4,402,603, issued in 1983.

SUMMARY OF THE INVENTION

The object of this invention is to provide an apparatus for actively adjusting the steering linkage system of land vehicles. In particular, the wheels are given a toe in or toe out adjustment to change a standard steer angle that would otherwise exist with the steering and suspension system as designed.

Typical systems include the solid axle beam and parallelogram linkage system for trucks and the rack and pinion steering systems for passenger cars. System components include steering arms, tie rods, idler arms, adjuster sleeves, ball joints, center links, steering knuckles and king pins which are referred to collectively in the industry and herein as steering linkage. This invention is novel in that it defines apparatus that can be used with original equipment vehicles and as an aftermarket device. A process is defined that will not only provide theoretically correct Ackerman steer angle with approximately zero error for all possible steer angles, but will also give toe in or toe out features of both front and rear wheels, which can be an important strategy for enhanced performance of the vehicle and its tires.

The steer angles of most vehicles will change during maneuvers of the vehicle due to a toe in or toe out effect as the suspension system is compressed or extended from its static position. This may enhance or deteriorate vehicle performance, and it applies whether the vehicle is in a turn or going straight ahead. For example, to improve center feel and stability in straight ahead driving it is desirable for most vehicles to have a toe in attitude with all 4 wheels. However, in braking maneuver the front suspension is compressed and the rear suspension is extended and all wheels on many vehicles will toe out. Therefore, the strategy of the active toe adjustment apparatus would be to correct this toe out situation to the extent that all wheels would adjust their respective toe setting to achieve maximum stability. For improved traction and steering stability while braking in a left turn it is desirable to have the left front and right rear wheels toe in and the right front and left rear wheels toe out on most vehicles. For this case, if the curve is relatively flat, the effect of the turn results in desirable toe angles, but the braking does not result in correct toe angles for the left front and right rear wheels on most vehicles. Therefore, active toe adjustment for these two wheels is suggested and desirable. It is not within the scope of this invention to formulate various strategies but to define a process and a means to actively make these toe adjustments.

While modifications to the tie rods by adding an active toe adjustment apparatus is the heart of the invention and provides the central feature, the complete system including the measurement device, the computer modules, the power supply and the signal conditioner in combination define the balance of the invention.

The invention will be better understood with the following descriptions and the accompanying drawings showing various vehicles schematics and apparatus without limiting the scope of the invention.

BEST MODE AND PREFERRED EMBODIMENT

Figure 1:
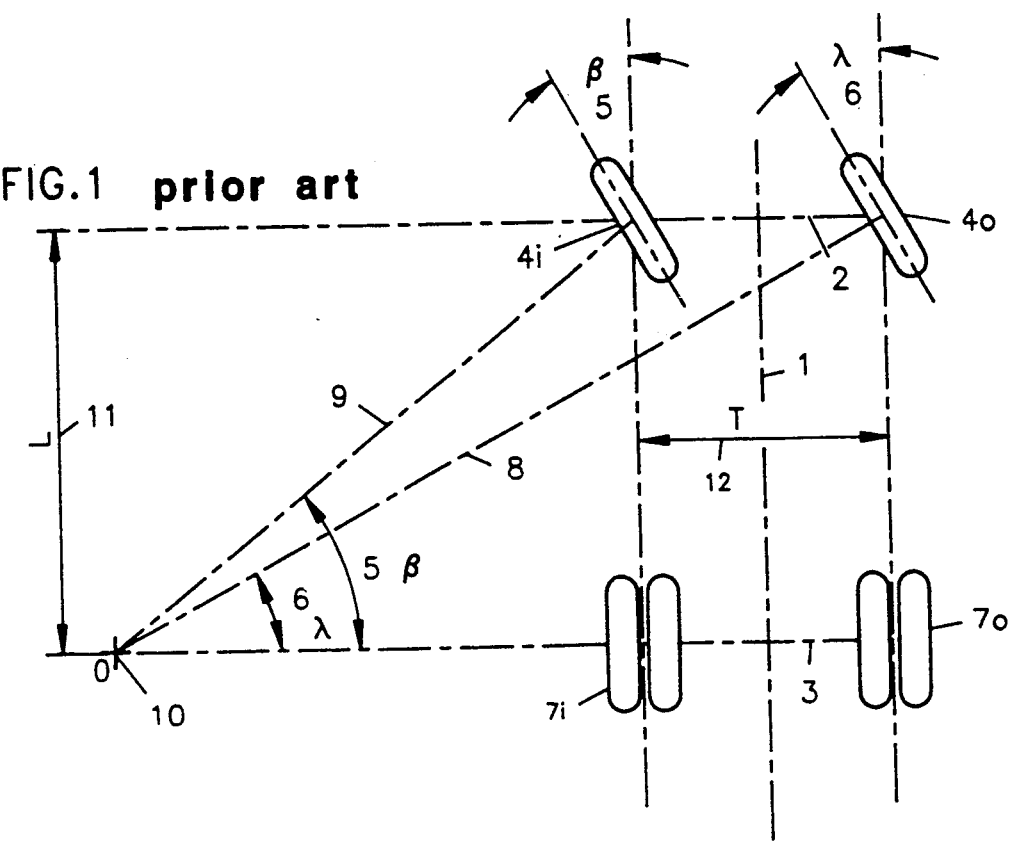
FIG. 1 is a plan view schematic of a typical truck wheel arrangement illustrating the Ackerman principle for pure rolling motion about a center of turn on the extension of the rear axle center line.

Referring now to the drawings in detail, FIG. 1 shows the long-accepted Ackerman principle where the axis 2 of front wheels 4 and the axis 3 of the rear wheels 7 are perpendicular to the longitudinal axis I of the vehicle. The front wheels 4 are steerable with the inside front wheel $4i$ having a $\beta$ angle 5 and the outside front wheel $4o$ having a $\lambda$ angle 6 with respect to the longitudinal axis 1. Neither the inside rear wheel $7i$ or the outside rear wheel $7o$ are steerable in this illustration, so their steer angles are shown to be zero. For theoretical Ackerman all wheels should move in a circle around a turn axis 10 of the vehicle. The result is that the rotational axis 8 of the front outside wheel $4o$, the rotational axis 9 of the front inside wheel $4i$ and the axis 3 of the rear wheels 7 intersect this turn axis 10. The intersection of the turn axis 10 with the axis 3 of the rear wheels is at point 0. If one of the front wheels 4 is used as a slave wheel for measuring its steer angle the desired steer angle of the other wheel is a function of the L wheelbase distance 11 between front axis 2 and rear axis 3 and the T track distance 12 which is the steer rotational axis distance between front wheels $4i$ and $4o$.

Figure 2:
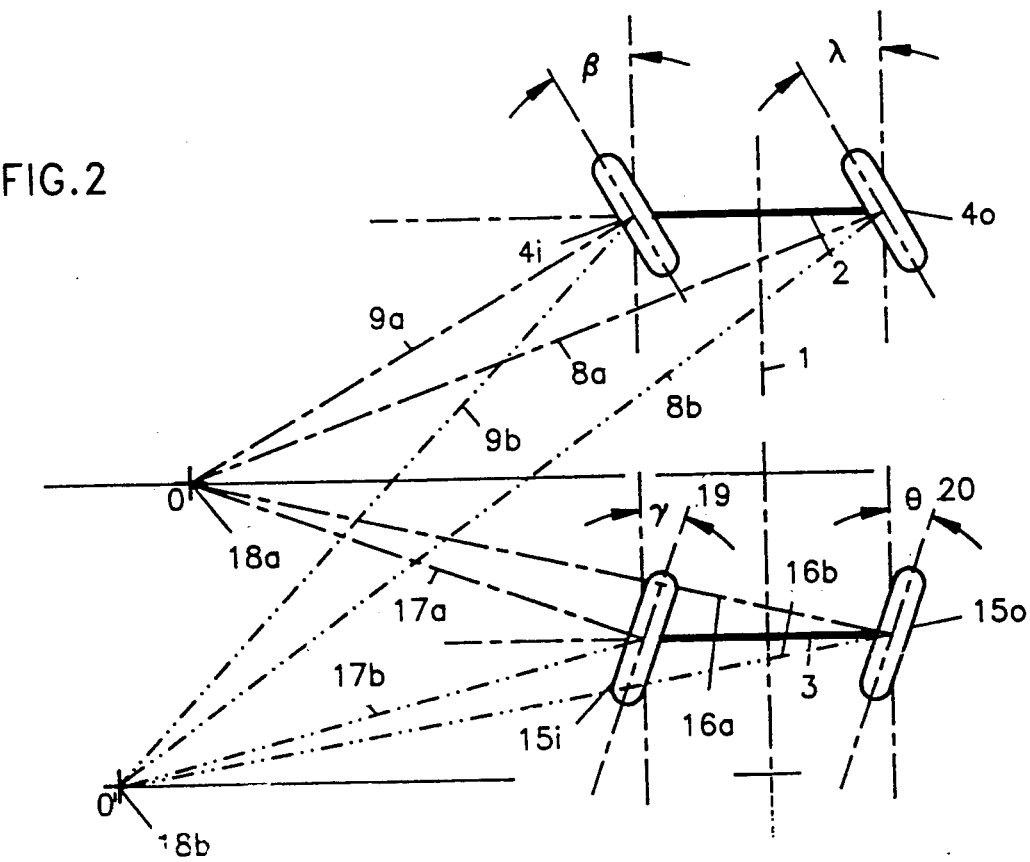
FIG. 2 is a plan view schematic of a vehicle with four steerable wheels illustrating the Ackerman principle where the center of turn can be either forward of the rear axle center line extended or behind said line extended, but with wheel positions shown for only the former case.

The four-wheel steering vehicle, being more recently accepted as conducive to the Ackerman principle, is illustrated in FIG. 2 and can have its turn axis 18 forward of the axis 3 of the rear wheels 15 or behind the axis 3 of the rear wheels. The forward position of the turn axis $18a$ is associated with a steering logic where the rear wheels 15 are at angles $\gamma$ 19 and $\theta$ 20 with respect to the vehicle longitudinal axis 1 which are opposite to the front wheels 4. This logic is commonly associated with greater front wheel steering angles $\beta$ and $\lambda$ as well as low vehicle speeds. In this case the rotational axis $9a$ of the front inside wheel $4i$, the rotational axis $8a$ of the front outside wheel $4o$, the rotational axis $17a$ of the rear inside wheel $15i$ and the rotational axis $16a$ of the rear outside wheel $15o$ intersect the turn axis $18a$ shown at a point O on this plan view. The behind or aft position of the turn axis $18b$ is associated with a steering logic having small steering angles $\beta$ and $\lambda$ as well as high vehicle speeds. In this case both the inside rear wheel $15i$ steers thru an angle $\gamma$ 19 and the outside rear wheel $15o$ steers thru an angle $\theta$ 20 in the same direction as the front wheels 4 relative to the vehicle longitudinal axis 1. The result of this logic is such that the rotational axis $9b$ of the front inside wheel $4i$, the rotational axis $8b$ of the front outside wheel $4o$, the rotational axis $17b$ of the rear inside wheel $15i$ and the rotational axis $16b$ of the rear outside wheel $15o$ intersect the turn axis $18b$ at a point O' on this plan view.

Figure 3:
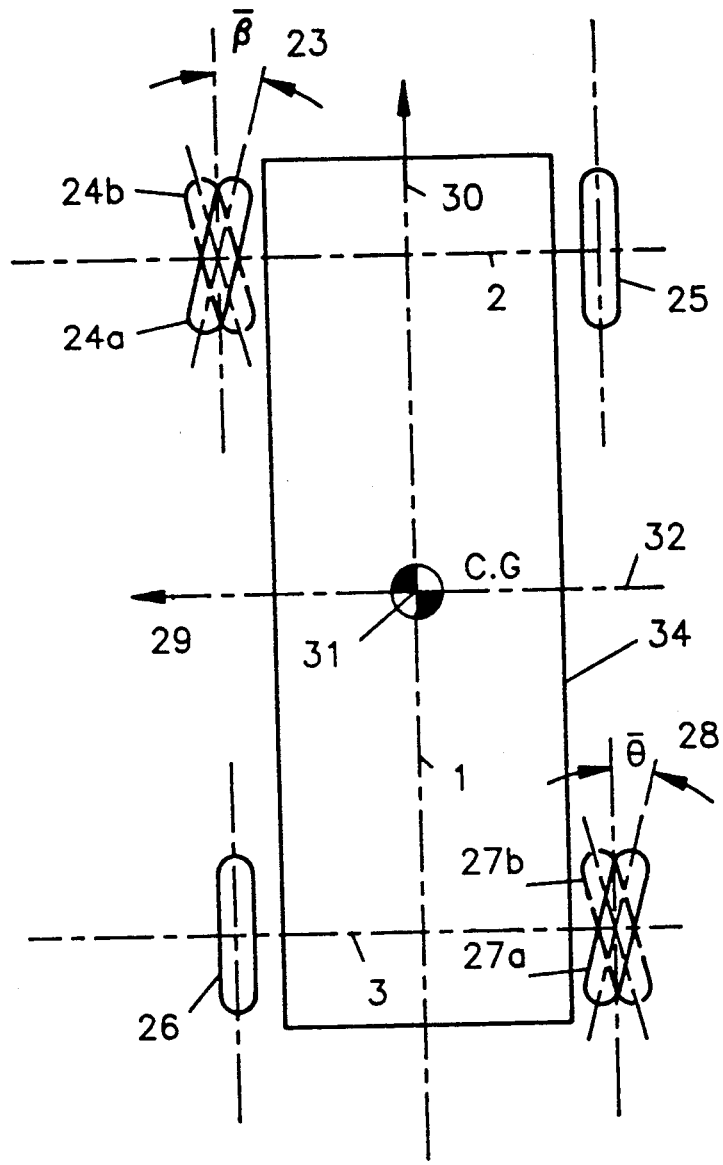
FIG. 3 is a plan view schematic of a vehicle with the left front and right rear wheels having toe changes relative to the vehicle body, and where the solid line illustrates what happens with a rebound of the vehicle and the dashed line illustrates what happens with a jounce of the vehicle.

The steer angle changes introduced by vehicle maneuvers are illustrated in FIG. 3, where a transverse pitch axis 32 of the vehicle is introduced thru the vehicle center of gravity 31. The forward motion vector 30 and the left turn side motion vector 29 are each considered as positive directions for this discussion, according to right hand rule. The outside front wheel 25 and the inside rear wheel 26 are both shown as being statically adjusted to zero steer angles. A toe in angle $\overline{\beta}$ 23 is illustrated by the solid lines for the inside front wheel $24a$ and a toe out angle is illustrated by the dashed lines for the inside front wheel $24b$. A toe out angle $\overline{\theta}$ 28 is illustrated by the solid lines for the outside rear wheel $27a$ and a toe in angle is illustrated by the dashed lines for the outside rear wheel $27b$. Vehicle suspension systems are such that toe angles are introduced or changed as the suspension system for each wheel is extended or compressed. During braking the vehicle pitches, to give a positive vector 29 about the pitch axis 32, resulting in the front wheels 24 and 25 being compressed toward the vehicle body 34 and the rear wheels 26 and 27 being extended from the vehicle body 34. For most vehicle suspension systems the opposite toe angle is realized between front and rear wheels when the suspension system is compressed or extended. The inside front wheel $24a$ and the outside rear wheel $27a$ both illustrate the relative suspension systems being extended. Both front wheels act the same and both back wheels act the same. Therefore, in a straight ahead braking maneuver, all four wheels toe out. The opposite pitching motion about pitch axis 32 is observed with acceleration and all wheels toe in. For left turn the vehicle body 34 rotates about the longitudinal axis 1 to give a positive vector 30. The result is that the outside wheels 25 and 27 have their suspension system compressed, due to load transfer to the outside, and inside wheels 24 and 26 have their suspension systems extended. The result is that wheels 25 and 26 toe out where wheels 24 and 27 toe in. Just the opposite toe situation occurs with a right turn due to the load transfer to the left side.

Vehicle bounce describes the vehicle with all suspensions extended. This gives both front wheels 24 and 25 having a toe in and both rear wheels 26 and 27 having a toe out. Vehicle jounce is the opposite to the bounce situation so both front wheels 24 and 25 have a toe out situation and both rear wheels 26 and 27 having a toe in attitude. Various combinations of these maneuvers and situations can occur simultaneously. Further considerations can also be given to steer angle toe in or toe out changes due to aerodynamic effects and the slope of the roadway. All vehicle maneuver toe angle changes are important in providing an accurate toe adjustment apparatus to obtain theoretical Ackerman angles and enhanced performance of the vehicle and its tires. These toe angle changes are primary considerations in straight ahead stability and transitional stability of the vehicle.

Figure 4:
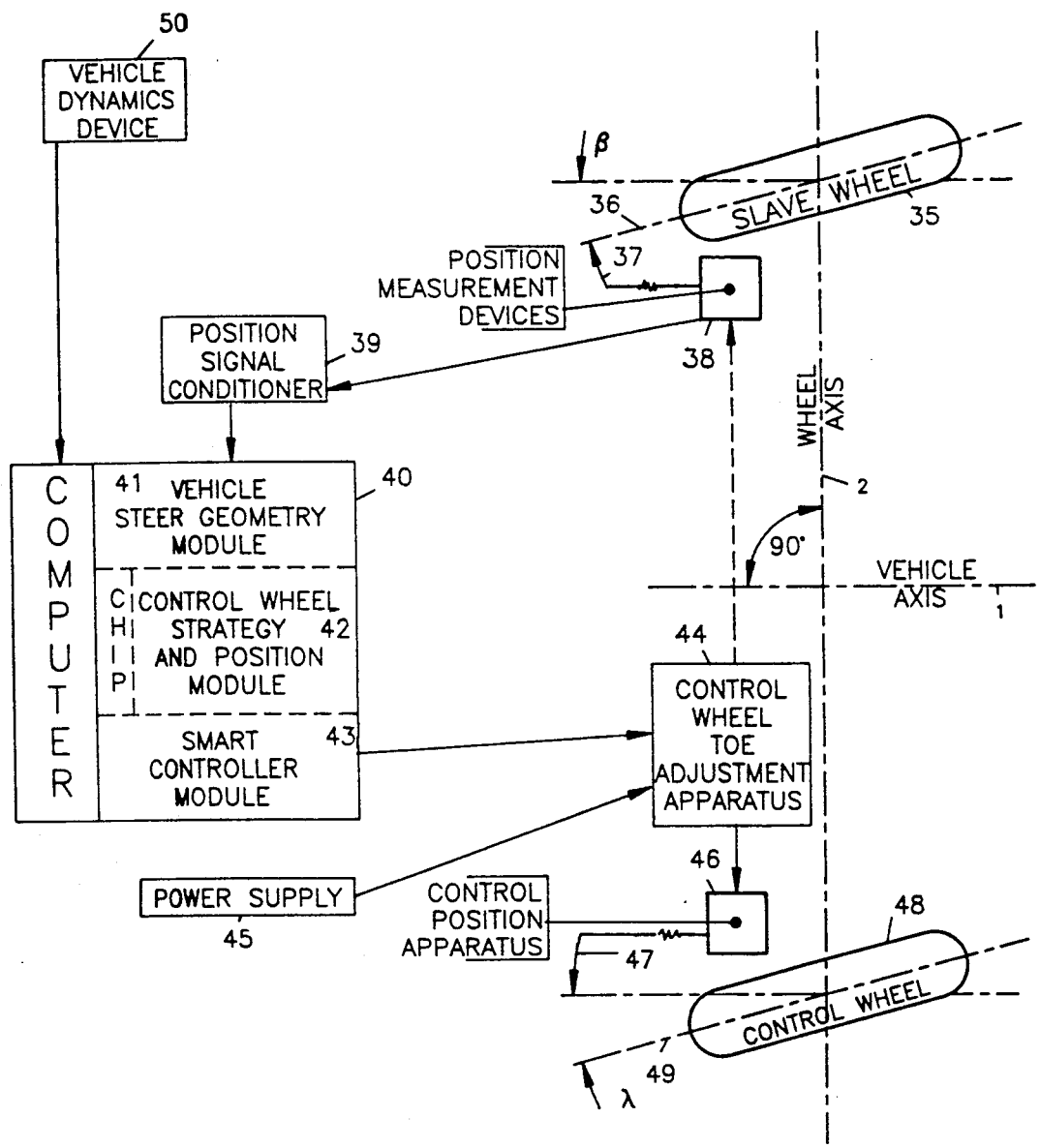
FIG. 4 is a process flow chart for a vehicle capable of active toe adjustment of a control wheel based on either a position measurement device on the slave wheel or a separate vehicle dynamics device or system.

The process of sensing toe angles and vehicle dynamics, conditioning the electrical signals, computing accurate adjustments based on a selected strategy and modifying the steering apparatus to actively adjust the steer angle is illustrated in FIG. 4. For theoretical Ackerman corrections, the steer angle $\beta$ 37 of the slave wheel axis 36 of a slave wheel 35 is sensed relative to the longitudinal vehicle axis 1 using any one or more standard electromechanical position measurement devices 38 available in the industry. A typical position device is the 1850 series position transducer as manufactured by Houston Scientific International, Inc. of Houston, Tex., which is commonly called a sting-pot potentiometer in the industry. This steer angle 37 signal may require a position signal conditioner 39 for proper analog or digital signals to be sent to the computer 40. Such conditioners are also standard in the industry. In cooperation with slave wheel signals and to have vehicle attitude and dynamics information, additional signals may be available from a vehicle dynamics device 50 or measurement system. This vehicle dynamics device 50 is necessary if all wheels are to be independently controlled with no slave wheels being used. The computer 40 is simulated by three functional modules. The vehicle steer geometry module 41 has all the suspension and steering system geometry stored and it computes the position and attitude of control linkages from the slave wheel 35 and/or vehicle dynamics device 50 signals. A typical dynamics device is the model no. CF18-0901-1 dynamic test stabilization system manufactured by Humphrey, Inc. of San Diego, Calif. The control wheel strategy and position module 42 is a computer chip that can be changed to reflect different usages of the same vehicle. The smart controller module 43 generates the proper electrical signal as the output from the computer to the control wheel toe adjustment apparatus 44. Standard computer hardware with sufficient memory and programming capability as exists in the industry can be used. A standard electrical or hydraulic power supply 45 can be used as available on the vehicle and consistent with the apparatus of this invention. The resulting changes in the $\lambda$ toe angle 47 of the control wheel axis 49 of the control wheel 48 results in the proper steer angle of the control wheel 48 consistent with the scope of this invention. Any steerable or actively adjustable wheel could be a control wheel with proper embodiment of this invention.

Figure 5:
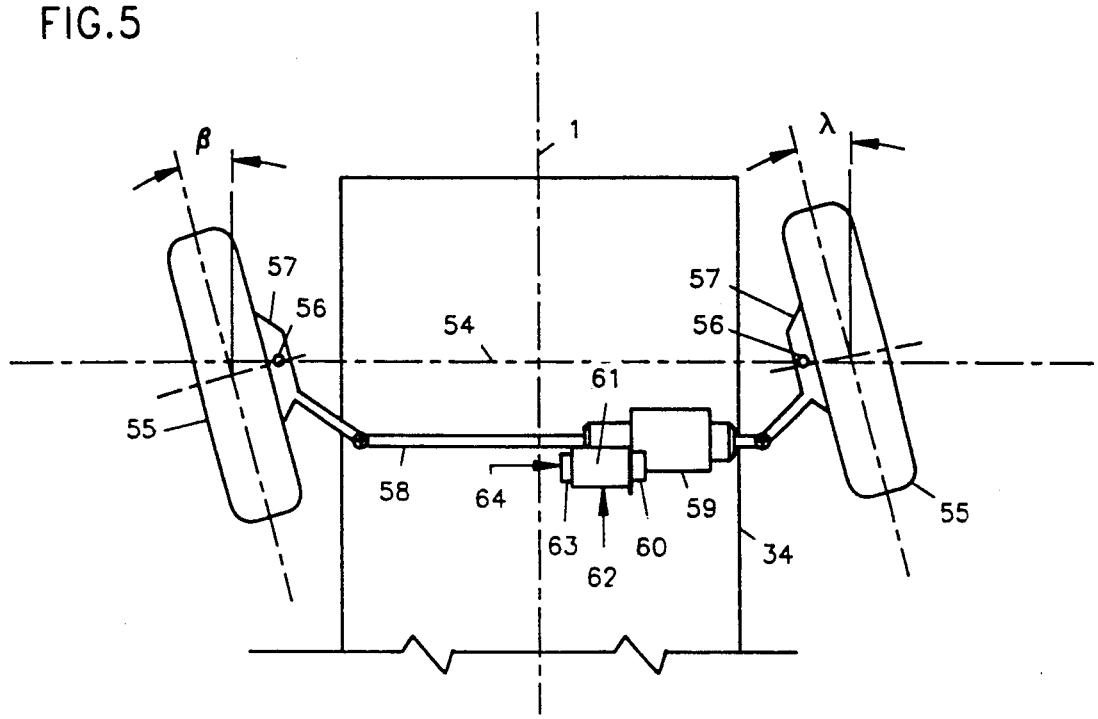
FIG. 5 is a plan view schematic of steerable wheels interconnected by a linkage having an electromechanical apparatus attached for actively adjusting the length of this linkage.

A preferred embodiment of this invention is illustrated in FIG. 5, which shows a schematic for key components of a truck steering system. A pair of steerable wheels 55 each of which are capable of being rotated steerably about a kingpin or steering pivot components 56 by a steer arm and spindle apparatus 57 connected to tie rod 58. The steering pivot components 56 remain in a fixed position relative to one another along an axis 54 of the front wheels 55 and additional steering apparatus (not shown) are used to rotate the spindle apparatus and move the tie rod 58 from side to side. The length and inclination of each linkage is critical in providing the proper relationship between the inside wheel steer angle $\beta$ and the outside wheel steer angle $\lambda$. If the strategy is to provide a linkage having theoretically correct Ackerman, with small steer angle ($\beta$ compared with $\lambda$) errors, this relationship between $\beta$ and $\lambda$ for a fixed linkage occurs at only certain steer angles. To be correct at all steer angles, a mechanical actuator apparatus 59 is added by modifying the tie rod 58 so that its length can be actively changed during driving. An electrical motor 61, having power 62 supplied by the vehicle, moves the gears in the gear box 60, which in turn moves the actuator apparatus 59 based on a control signal 64 from the computer 40 (shown in FIG. 4). An optical encoder 63 provides feedback signals to the computer 40 for verification of the motor shaft 96 rotation. The tie rod 58 changes its length according to a pre-selected strategy. A strategy can be based on improving tire wear, reducing force reactions in the steering and suspension systems, better ride comfort and vehicle handling, or other similar performance criteria. This active toe adjustment apparatus for making changes in the steer angles has considerable utility in the trucking industry, as existing vehicles can be modified to significantly reduce tire wear.

Figure 7:
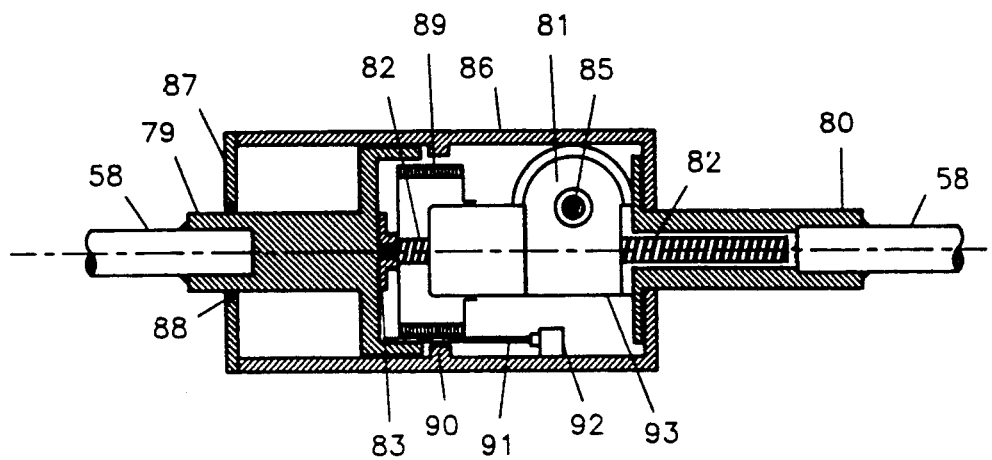
FIG. 7 is a partial section view of a mechanical apparatus for actively changing the length of a vehicle tie rod using a ball screw actuator device.
Figure 8:
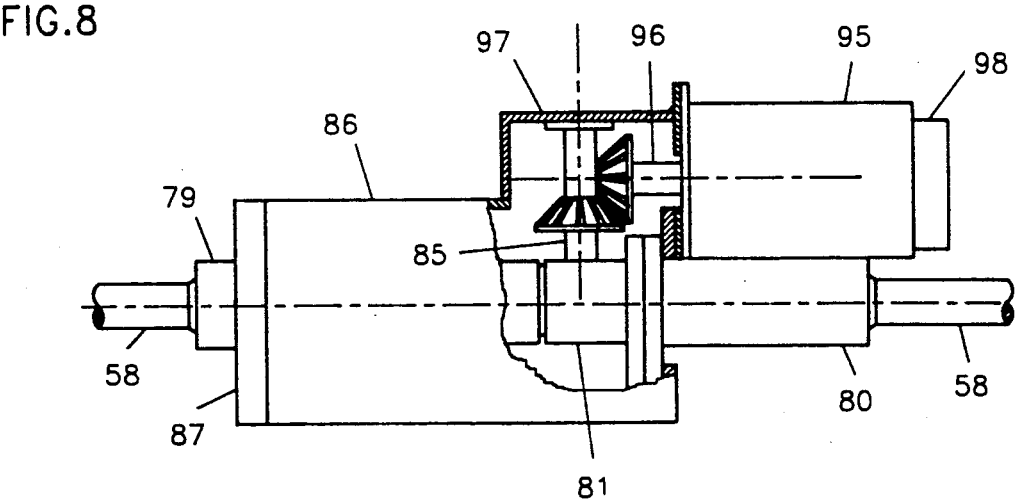
FIG. 8 is a partial sectional view of the mechanical apparatus of FIG. 7 showing a schematic of the motor power supply and the gear box device, plus an electrical optical encoder for generating feedback control signals.

Additional details and functional relationships of the components of the mechanical actuator apparatus are shown in FIG. 7 and FIG. 8. A section is cut out of the tie rod to give a modified tie rod 58. A slidably mounted tie rod sleeve 79 is attached to one end of the modified tie rod 58 and a fixed tie rod sleeve 80 is attached to the other end of this tie rod. These sleeves are interconnected with the actuator device 81 having a screw shaft 82 which moves through the actuator shell 93 when the worm gear shaft 85 is rotated. The screw shaft 82 is attached to the slidably mounted tie rod sleeve 79 using an actuator coupler 83, and the fixed tie rod sleeve 80 is fixed to the actuator shell 93 and the actuator housing 86. The slidably mounted tie rod sleeve 79 slides inside the actuator housing 86 through an aperture in the end cap 87 when the screw shaft 82 is rotated. A bellows boot 89, and a packing seal 88 protects the screw shaft 82 from foreign objects. Actuator devices are common in the industry; a typical example being the ball screw actuator device model 2800 manufactured by Duff-Norton in Charlotte, N.C., a subsidiary of Amstar Corporation. The actuator device 81 is powered by means of a microstepping motor 95 connected to the worm gear shaft 85 through the right angle gear device 97. Input power is provided in steps to the microstepping motor 95 from the smart controller module 43 (shown in FIG. 4) to move the motor shaft 96. The optical encoder 98 measures the actual motor shaft 96 rotation and provides a feedback signal to the smart controller module 43 for verification of rotation of the motor shaft 96. The reference position of one slidably mounted tie rod sleeve 79 is established by an actuator rod 91 attached thereto which contacts a limit switch 92 and gives a reference signal to the smart controller module 43. A failsafe mechanical stop 90 is provided inside the actuator housing 86 to limit the movement of the slidably mounted tie rod sleeve 79. Many components are standard in the industry. A typical microstepping motor and control is the AX series manufactured by Compumotor Division of Parker-Hannifin Corporation in Petaluma, Calif. A typical optical encoder device is manufactured by Dynamic Research Corporation's Encoder Division in Wilmington, Mass. Right angle gear devices are standard devices available from numerous manufacturers. A typical micro switch is manufactured by the MICRO SWITCH Division of Honeywell. Standard devices have more utility within the scope of modifying existing vehicles.

Figure 6:
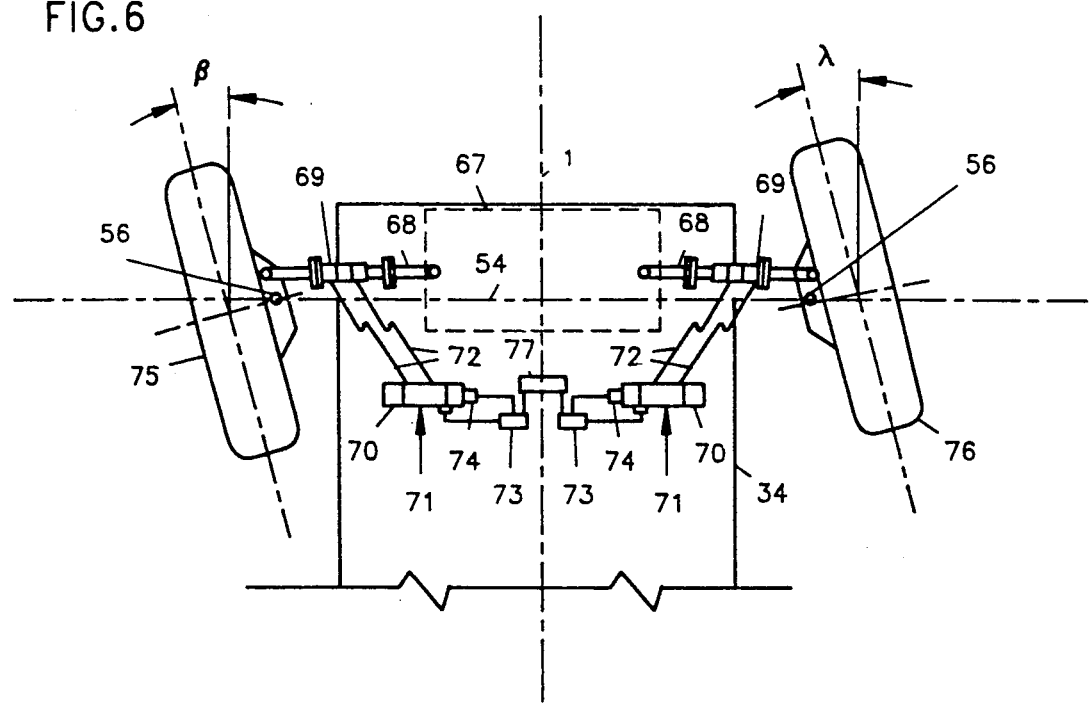
FIG. 6 is a plan view schematic of independently steerable wheels each having a linkage with a servo valve and hydraulic apparatus attached for actively adjusting the length of the linkage.

An alternative to the mechanical actuator device of FIG. 5 is the hydraulic actuator and servo valve system of FIG. 6 for smaller vehicles with independently steerable wheels. However, this system could also be used in single apparatus and large vehicle applications. A suspension and steering assembly 67 is schematically illustrated as having more than one tie rod 68 each modified to include a hydraulic actuator 69 for active toe adjustments in the steer angles $\beta$ and $\lambda$ of the wheels 75 and 76 respectively. Controlled hydraulic power to each hydraulic actuator 69 is provided by a plurality of hydraulic tubes 72 from a servo valve 70. Vehicle hydraulic power 71 is supplied to the servo valve 70, and control signals from the onboard computer 77 are input to the servo control card 73 and on to the servo valve 70. The optical encoder 74 measures the actual movement of the servo valve mechanism and provides a feedback signal to the servo control card 73 for verification of valve mechanism movement. The hydraulic actuator 69 servo valve 70, servo control card 73 and optical encoder 74 are devices standard in the industry.

Tests made by the applicant have indicated that correcting the steer angles by a toe adjustment improves the tread life of the tires, reduces steering effort and improves handling. The amount of the improvement depends heavily on the type and use of the vehicle.

While the present invention has been disclosed in connection with the preferred embodiment thereof, it should be understood that there may be other embodiments which fall within the spirit and scope of the invention as defined by the following claims.

What is claimed is:

1. An apparatus for use on a land vehicle having at least a pair of steerable wheels, including a slave wheel and a control wheel, with their steer angles controlled by standard steering linkages and in which each vehicle wheel rotates about an axis, said apparatus comprising:

means for sensing the steer angle of a slave steerable wheel during turning maneuvers of said vehicle;

means for calculating a turn axis of intersection between a vertical plane containing the axis of rotation of a front slave steerable wheel and a vertical plane containing the axis of rotation of a rear slave steerable or fixed wheel using the steer angles sensed by said sensing means and producing toe adjustment angle signals;

means for computing a strategy to provide electrical strategy signals as a function of said vehicle turning maneuvers and said turn axis location;

means for calculating toe adjustment angles for the steer angle of a control steerable wheel using the geometry of said standard steering wheel using the geometry of said standard steering linkages and said strategy signals such that all the axis of rotation of all steerable wheels substantially intersect said turn axis and producing toe adjustment angle signals;

means for outputting electrical control signals as a function of said toe adjustment angle signals; and a toe adjustment apparatus attached to a standard steering linkage to effect toe adjustment angle change, said toe adjustment apparatus having an electrical motor with a power supply controlled by said electrical control signal output means, a gear box connected to said electrical motor and a mechanical actuator apparatus attached to a standard steering linkage, which has been modified to allow said attachment, and to the gear box, said mechanical actuator apparatus comprising:

a) a slidably mounted tie rod sleeve and a fixed tie rod sleeve both suitably attached to said standard steering linkage being a modified tie rod of said vehicle, said tie rod being bisected and a section removed to accommodate said two sleeves;

b) an actuator device with a screw shaft slidably mounted therein and attached at one end to said slidably mounted tie rod sleeve;

c) an actuator housing which contains said actuator device suitable attached to said fixed tie rod sleeve at one end and having an aperture in the other end to permit the slidably mounted tie rod sleeve to move in or out of said aperture as said actuator device moves said screw shaft;

d) means for rotating a gear shaft, using said electrical motor, a predetermined pusher of turns to advance said screw shaft and thereby changing the length of said tie rod, thereby adjusting the toe angle of at least one steerable wheel of said vehicle; and e) means for detecting the actual number of turns of said screw shaft and providing feedback signals for proper control of the length of said tie rod.

2. The apparatus for use on a land vehicle as recited in claim 1, wherein the travel of said slidably mounted tie rod sleeve in said actuator housing results in the length of said tie rod for a large truck to vary by approximately 2 inches.

3. An apparatus for use on a land vehicle as recited in claim 1 wherein the sensing means further comprises:

a) means for detecting the motion of said vehicle using a vehicle dynamics device; and b) means of outputting electrical dynamics signals from said detecting means for providing input for computing said electrical strategy signals using a computer having a geometry module and containing a strategy ship and a smart controller.

* * * * *